July 18, 1967    U. F. CARTER    3,331,931
PUSHBUTTON ACTUATOR FOR AN ELECTRICAL CONTROLLER
Original Filed Dec. 11, 1963                    7 Sheets-Sheet 1
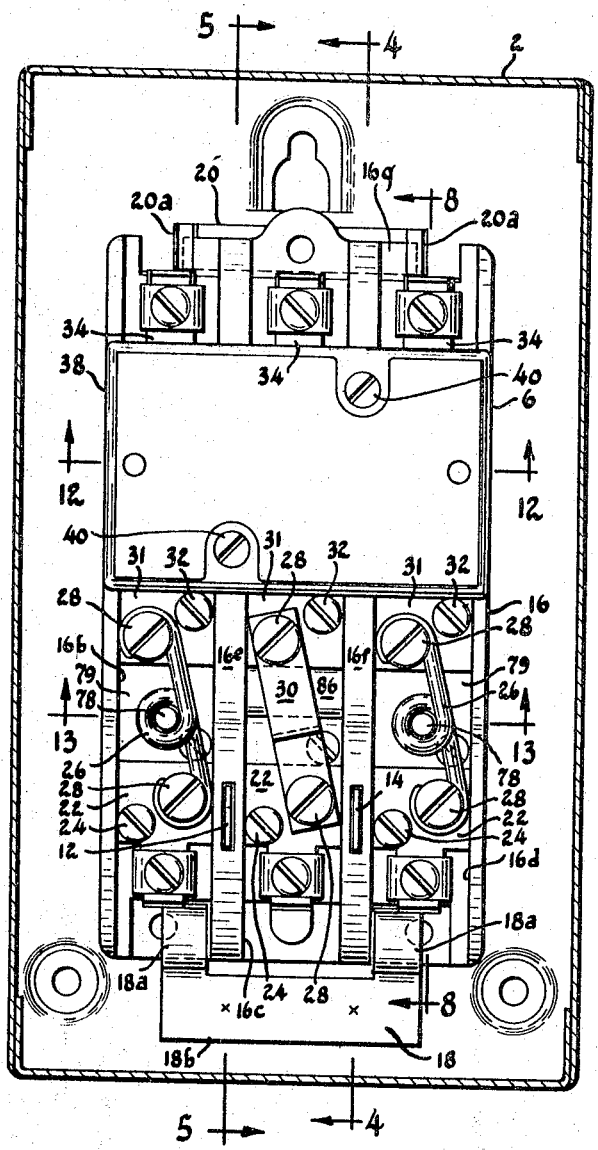
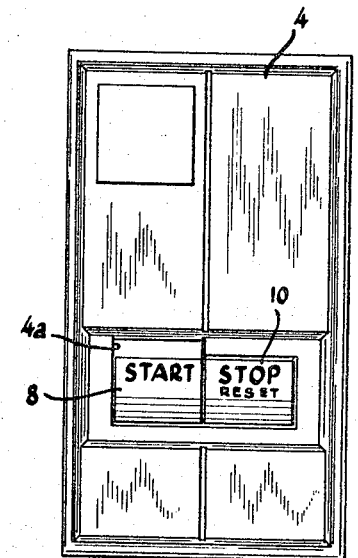
Inventor
Uriel F. Carter
By H. R. Rutter
Attorney July 18, 1967 U. F. CARTER 3,331,931
PUSHBUTTON ACTUATOR FOR AN ELECTRICAL CONTROLLER
Original Filed Dec. 11, 1963 7 Sheets-Sheet 2

Inventor
Uriel F. Carter
By H R Ratter
Attorney

July 18, 1967  U. F. CARTER  3,331,931
PUSHBUTTON ACTUATOR FOR AN ELECTRICAL CONTROLLER
Original Filed Dec. 11, 1963  7 Sheets-Sheet 3

Inventor
Uriel F. Carter
By H. R. Rather
Attorney

July 18, 1967 U. F. CARTER 3,331,931
PUSHBUTTON ACTUATOR FOR AN ELECTRICAL CONTROLLER
Original Filed Dec. 11, 1963 7 Sheets-Sheet 4
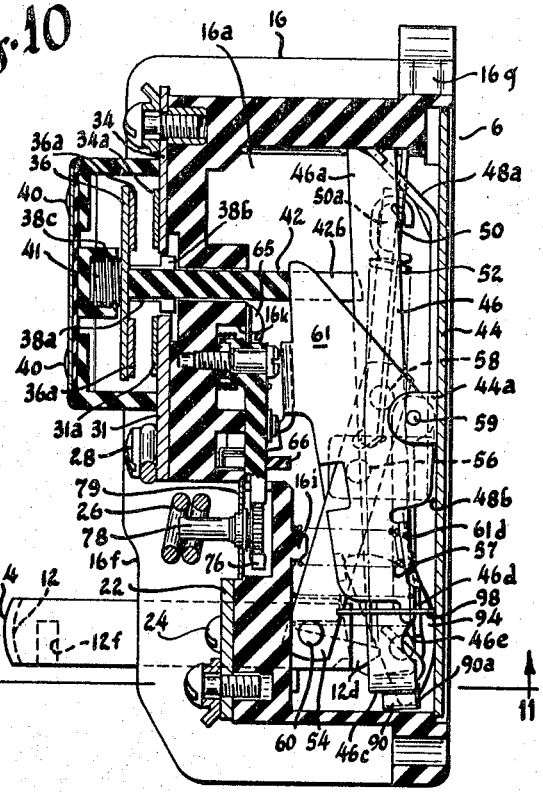
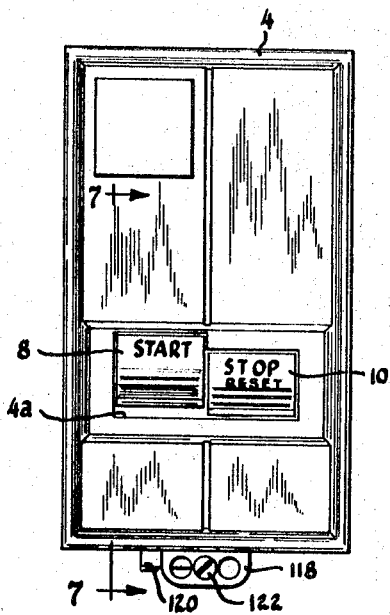
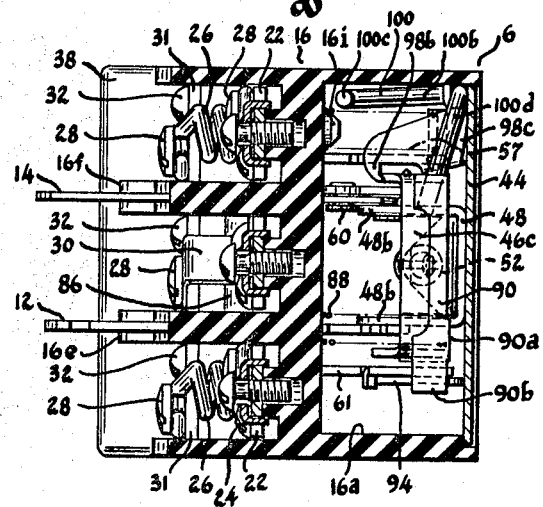

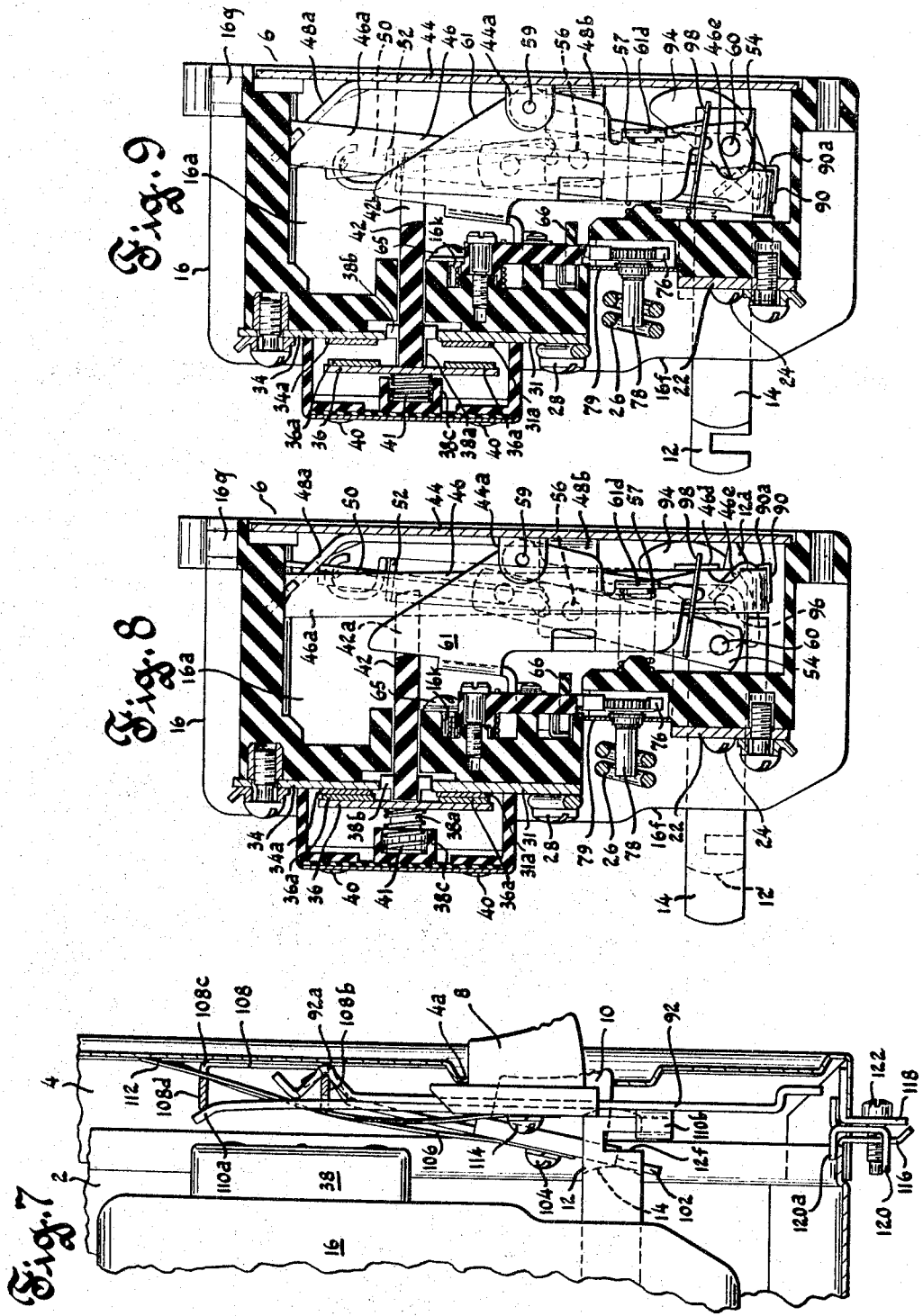

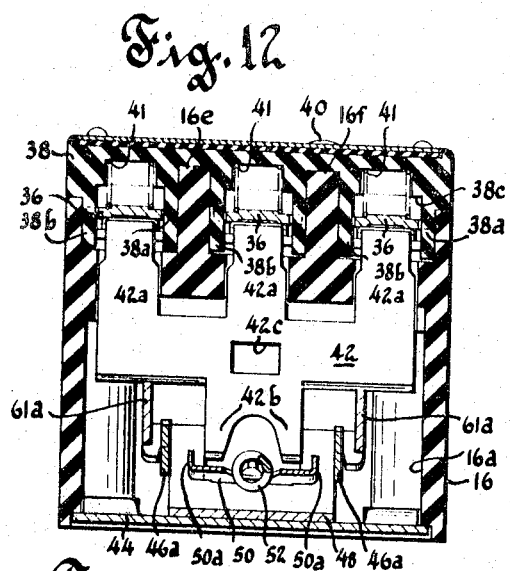
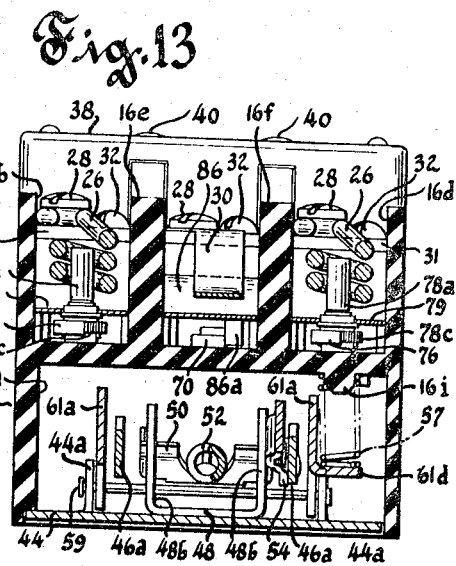
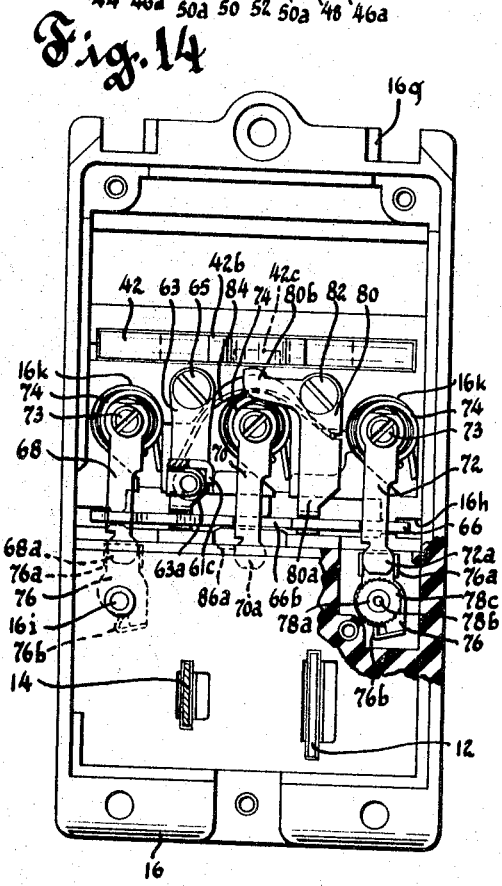
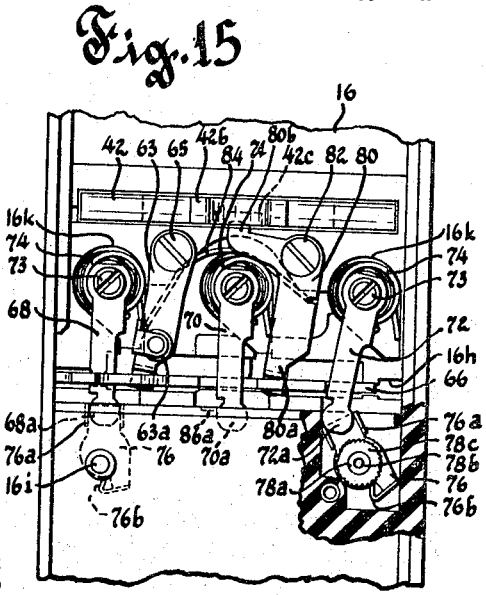
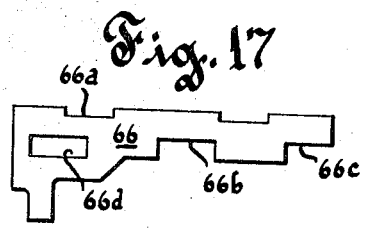

July 18, 1967 U. F. CARTER 3,331,931
PUSHBUTTON ACTUATOR FOR AN ELECTRICAL CONTROLLER
Original Filed Dec. 11, 1963 7 Sheets-Sheet 7

United States Patent Office 3,331,931
Patented July 18, 1967

3,331,931
PUSHBUTTON ACTUATOR FOR AN ELECTRICAL CONTROLLER
Uriel F. Carter, Wauwatosa, Wis., assignor to Cutler-Hammer, Inc., Milwaukee, Wis., a corporation of Delaware
Original application Dec. 11, 1963, Ser. No. 329,750, now Patent No. 3,267,239, dated Aug. 16, 1966. Divided and this application Oct. 20, 1965, Ser. No. 498,867
4 Claims. (Cl. 200—50)

This is a division of copending application Ser. No. 329,750, filed Dec. 11, 1963 now Patent No. 3,267,239.

This invention relates to an electrical controller of the manually operable, overload responsive type.

It is a primary object of the invention to provide an improved controller of the aforementioned type inclusive of its housing and external operators.

A more specific object is to provide a controller of the aforementioned type incorporating a switch unit characterized by having manually operable contact closing and opening means, and overload responsive means which function independently of the former means to effect contact opening under overload conditions but which are resettable by operation of said former means.

Another specific object is to provide an improved pushbutton operating mechanism for the aforementioned switch unit which is characterized by being mounted in an enclosing case cover and having one pushbutton manually shiftable between a position affording normal, maintained operation in conjunction with alternate operation of a second pushbutton, and another position in which momentary operation of the switch unit is afforded by depression and release of the first mentioned pushbutton itself.

A still further specific object is to provide an improved form of frictional, quick release securing means for holding the switch unit mounted in place in the enclosing case which obviates need for tools in either securing or detaching the unit from the case.

Other objects and advantages of the invention will hereinafter appear.

The accompanying drawings illustrate a preferred embodiment which will now be described in detail, it being understood that the embodiment disclosed is susceptible of modifications without departing from the scope of the appended claims.

In the drawings:

FIGURE 1 is a front view, to reduced scale of an electrical controller constructed in accordance with the invention;

FIG. 2 is a side view of the controller;

FIG. 3 is a front view of the controller with the cover removed;

FIG. 6 is a view like FIG. 1, but showing a pushbutton operator in another operating position;

FIG. 7 is a fragmentary sectional view of a portion of the controller mechanism taken generally along the line 7—7 of FIG. 6;

FIG. 8 is a longitudinal view of the controller switch unit taken along the line 8—8 of FIG. 3;

FIG. 9 is a side view like FIG. 8, but depicting another manual operating position;

FIG. 10 is a view like FIGS. 8 and 9, but depicting an overload tripped operating position;

FIG. 11 is a transverse cross sectional view taken along the line 11—11 of FIG. 10;

FIG. 12 is a transverse cross sectional view taken along the line 12—12 of FIG. 3;

FIG. 13 is a transverse cross sectional view taken along the line 13—13 of FIG. 3;

FIG. 14 is a bottom view of the switch unit with certain mechanism removed and with a portion shown in section;

FIG. 15 is a fragmentary view showing a portion of the switch unit shown in FIG. 14, but with certain apparatus depicted in overload tripped condition;

FIG. 17 is a front view of the trip slide bar; and

Figure 4:
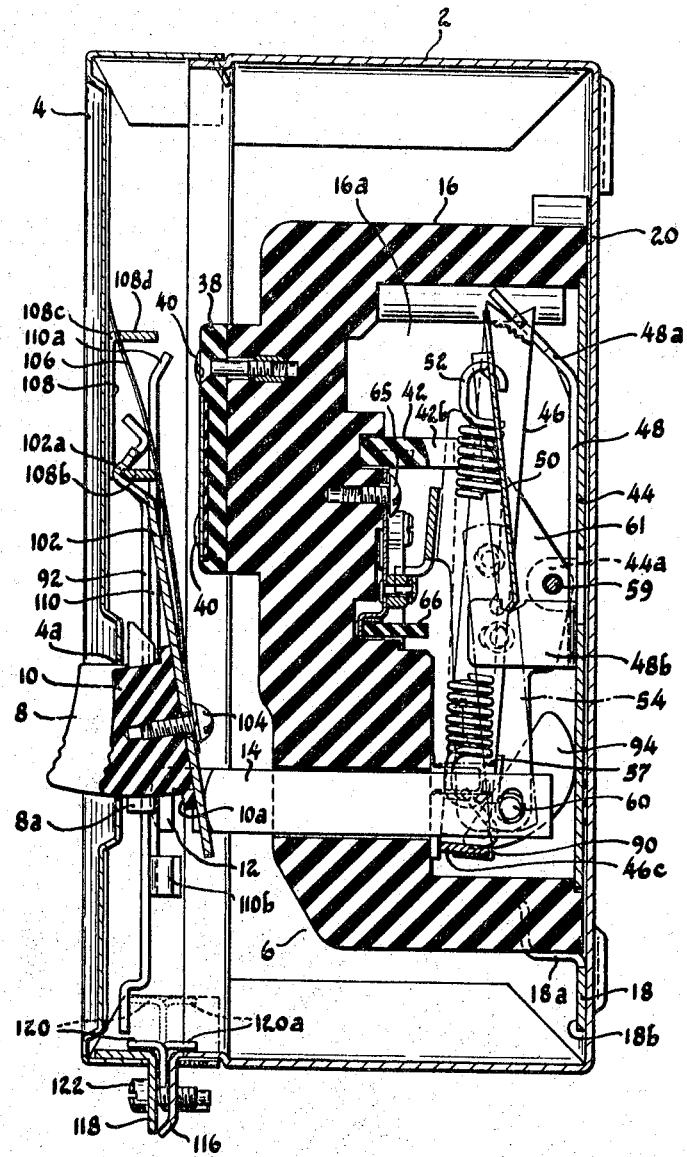
FIG. 4 is a view in longitudinal section taken along the line 4—4 of FIG. 3.

FIGS. 1 to 4 of the drawings show an electrical controller which is constructed in accordance with the invention. It comprises a rectangular sheet metal enclosing casing 2, a cover 4 which closes the open side of the casing and the switch unit 6. As will hereinafter be described in greater detail, a start button 8 and a stop-reset button 10 extend through the front face of cover 4 and are pivotally supported on the inside of the cover and have operating connections with operating members 12 and 14 of switch unit 6.

Switch unit 6, as best shown in FIGS. 4, 5, 8, 9, 10, 11, 12, 13, 14 and 15 comprises a molded insulating base 16 having a large, downwardly opening cavity 16a, and upwardly opening parallel, longitudinal recesses 16b, 16c and 16d. The recesses 16b and 16c are separated by the longitudinal barrier 16e and recesses 16c and 16d are separated by a similar barrier 16f. The recesses 16b and 16d are stepped upwardly from bottom to top in three steps as viewed in FIGS. 8, 9 and 10. Operating members 12 and 14 extend through complementally formed openings in barriers 16e and 16f respectively.

Bifurcated spring arms 18a of a spring clip 18 which is welded along its body portion 18b to the inner bottom wall of casing 2, interfit within recesses 16b and 16d and bear against the lowermost steps in the respective recesses to hold one end of the switch unit in mounted position. A substantially channel shaped clip 20 has spring arms 20a which grip the sides of a boss 16g formed at the other end of the base to assist in retaining the base in mounted position in casing 2. Referring, particularly to FIGS. 3 and 4, base 16 can be readily demounted from casing 2 by first lifting the last mentioned end of the base and disengaging it from arms 20a of clip 20, and then sliding it upwardly and out of engagement from the grip of arms 18a of the clip 18. Mounting of the switch unit 6 in casing 2, would, of course, be effected by a reverse order of such steps.

At the intermediate step on each of the recesses 16b and 16d and terminal plates 22, which as viewed in FIG. 3, have a T-shaped configuration. The plates 22 are secured in place by screws 24 which take into threaded recesses in base 16. Heater coils 26 of current responsive overload units are secured to corresponding ends by screws 28 to the terminal plates in the outer recesses 16b and 16d while a conductor strap 30 is secured at a corresponding end of a similar screw to the terminal plate in recess 16c. The heater coils and conductor strap are connected at their opposite ends by screws 28 to stationary contacts 31, which are secured by screws 32 to the uppermost step in the recesses 16b to 16d. Also secured to the base 16 in the same steps of the latter recesses are combination stationary contacts and terminal members 34. The stationary contacts 31 and 34 have contact tips 31a and 34a secured to and lying above the upper surfaces thereof.

As best shown in FIGS. 8 to 10, spring biased, movable contactors 36 having contact tips 36a overlie each of the alined pairs of stationary contacts 31 and 34, and in one operating position of the switch unit (see FIG. 8) are adapted to engage with the contact tips 31a and 34a for electrical circuit completion. Contactors 36 are mounted in a skirted cover 38 formed of a molded insulating material. Cover 38 is secured to the barriers 16e and 16f by screws 40 which take into threaded recesses. Downwardly depending, parallel spaced apart guide portions 38a interfit in notches formed in the opposite edges of contactors 36 and restrain the same against longitudinal and lateral displacement. The portions 38a have T-shaped ends 38b which define the lower limit of movement for the contactors 36. Coil spring 41 seating at one end of integral sockets 38c bear at their opposite ends against the contactors 36 and tend to move them into engagement with stationary contacts 31 and 34.

Cover 38 is provided with slots in its transverse skirts and is notched along its end skirts to accommodate and interfit with the barriers 16e and 16f and the upper surfaces of the side walls of base 16. The cover, barriers and side wall in interfitting relation shown provide individual, substantially closed arcing chambers for each set of stationary contacts and cooperating contactor. An insulated contactor operator 42 has three spaced apart arms 42a which project through openings extending from the lower cavity 16a of base 16 into each of the recesses 16b to 16d, respectively, bear against the lower surface of one of the contactors 36. As will be hereinafter more fully explained, operator 42 is adapted to be moved upwardly upon operation of stop-reset lever 14 to move the contactors out of engagement with their associated stationary contacts, and is adapted to permit downward movement of itself and the contactors 36 under the bias of the spring 41 when the start lever 12 is operated.

The manual and overload trip operating mechanism which is best shown in FIGS. 4, 5, 8 to 11 and 16, is supported on a mounting plate 44 which is secured to the bottom side of casing 16 and forms a closure for the open side of cavity 16. The mechanism comprises an elongated, U-shaped lever 46 having V-shaped notches in the ends of the legs 46a which engage in bearing notches formed in the bifurcated angularly sloped legs 48a of bearing bracket 48. Bracket 48 is spot welded to plate 44 and further comprises upstanding spaced parallel legs 48b having notches which are engaged by the upturned ends of the legs 50a of a flipper lever 50. A coiled tension spring 52 is anchored at one end of lever 50 and at its other end to a tab portion 46b secured to the middle of the bight 46c of lever 46. A drive lever 54 is pivoted by a pivot pin 56 on an elongated opening 48c in one of the legs 48b of bracket 48 and has a pivoted driving connection at one end with one of the legs 46a through a pivot pin 58. At its other end lever 54 is pivotally connected by a pivot pin 60 to the lower end of operating member 14 which has an elongated opening therein.

In normal operation, with the switch unit in the operating position depicted in FIG. 8, downward movement of operating member 14 pivots drive lever 54 in a direction causing upward pivoting of lever 46 until the end of the spring carried by the latter moves over center with respect to the bearing notch in bracket legs 48b, whereupon lever 50 is caused to pivot counterclockwise in the latter notch with snap action to engage the downwardly depending legs 42b of operator 42 and drive the latter upwardly and move contactors 36 out of engagement with stationary contact pairs 31–34 with corresponding snap action movement (see FIGS. 8 and 9).

A separate trip lever 61 is provided to independently move operator 42 upwardly to open the switch contacts under current overload conditions. Lever 61 comprises spaced apart parallel legs 61a which are mounted for pivotal rotation on an elongated pivot pin 59 which penetrates alined openings in the legs 61a and parallel bearing bracket portions 44a which are struck out and up from mounting plate 44. The legs 61a are interconnected by a web 61b having a latch lug 61c integral therewith. A compression spring 57 bearing at one end around a boss 16i formed on the inner wall of cavity 16a, bears at its other end against a tab 61d formed on the outer side of leg 61a. Latch lug 61c is engaged by a roller 63a mounted on a latch lever 63 which is pivotally mounted to the inner wall of cavity 16a on a pivot screw 65 (see FIGS. 14 and 15). In the operating position depicted in FIGS. 8, 9, 13 and 14 latch lever 63 engages its roller 63a behind the right angle hook on lug 61c and holds trip lever in the position depicted.

Latch lever 63 has an end that penetrates through a notch 66a in trip slide bar 66 which is mounted in the transverse recess 16h formed in the inner wall of cavity 16a. Slide bar 66 also has notches 66b and 66c and opening 66d formed therein and molded levers 68, 70 and 72 extend beyond the slide through these notches and recesses. Levers 68, 70 and 72 are pivotally mounted on pivot pins 73 which take into threaded openings in the inner wall of cavity 16a. Torsion springs 74 disposed in recesses 16k surrounding the pivot ends of the last mentioned levers urge the latter to the left as viewed in FIGS. 14 and 15 and tend to pivot latch lever 63 to the left to disengage the roller 63a from latch lug 61c.

At their free ends levers 68, 70 and 72 have arcuate portions 68a, 70a and 72a and the latter portions of members 68 and 72 fit within the side walls of channel-shaped portions 76a of detent member 76. Members 76 are mounted for rotation on the outer walls of tubular members 78a of two overload sensitive elements 78. The members 78 are non-rotatably secured in apertures of mounting plates 79 which are in turn secured in each of the recesses 16b and 16d by screws. Pins 78b concentrically fit within each of the members 78 and are normally bonded thereto by a solidified film of eutectic solder. Ratchet wheels 78c which are non-rotatably fixed on the pins 78b are engaged by pawl portions 76b of detent members 76. Under normal conditions latch lever 63, slide bar 66, levers 68, 70 and 72 and detents 76 are in the positions shown in FIGS. 8, 9 and 14 wherein the latter members restrain levers 68, 70 and 72 from moving slide bar 66. When either of the heater coils 26 is sufficiently energized to melt the solder film between the outer tube 78a and a pin 78b the latter and the ratchet wheel 78c fixed thereat are free to rotate under the bias exerted by a torsion spring 74 acting through either of the levers 68 and 72 and a detent 76. When this occurs slide bar 66 is also moved by the free lever 68 or 72 to the left to the position depicted in FIG. 15. In so moving slide bar 66 pivots lever 63 clockwise (as viewed in FIGS. 14 and 15) to move its roller 63a out of engagement with latch lug 61c of trip lever 61. Lever 61 is thus released to pivot counterclockwise under the bias of spring 57 from the position depicted in FIGS. 8 and 9 to that shown in FIG. 10. In so moving, the ends of the legs 61a drive operator 42 upwardly to move contactors 36 out of engagement with the stationary contact pairs 31–34.

A bell crank latch lever 80 pivoted on a screw 82 secured to the inner wall of cavity 16a has a leg 80a projecting through a slot in slide bar 66 and another leg 80b. An open, hairpin type tension spring 84 is hooked at one end in a notch in latch lever 63. Spring 84 tends to pivot lever 63 counterclockise and lever 80 clockwise, as viewed in in FIGS. 14 and 15 but under normal conditions slide bar 66 holds them in the positions depicted in FIG. 14. Upon occurrence of an overload slide bar 66 is driven to the left, spring 84 pivots latch lever 80 clockwise, and when operator 42 is driven upwardly as aforedescribed, the end of the leg 80b projects into a recess 42c in operator 42 to lock the same in the contactor open position.

As shown, there is no overload sensitive element, detent latch, etc., operatively associated with the lever 70. A plate 86, which is somewhat similar to the mounting plates 79, but has a downward depending leg 86a (see FIG. 13) which engages with the lever 70 to restrain it from movement under the bias of its torsion spring 74. It will be understood, that if required, plate 86 can be replaced by a mounting plate 79 having an overload sensitive element 78 mounted therein, and in that case, an overload in the circuit branch associated with lever 70 would cause the latter to drive the slide bar 66 as aforedescribed.

Figure 5:
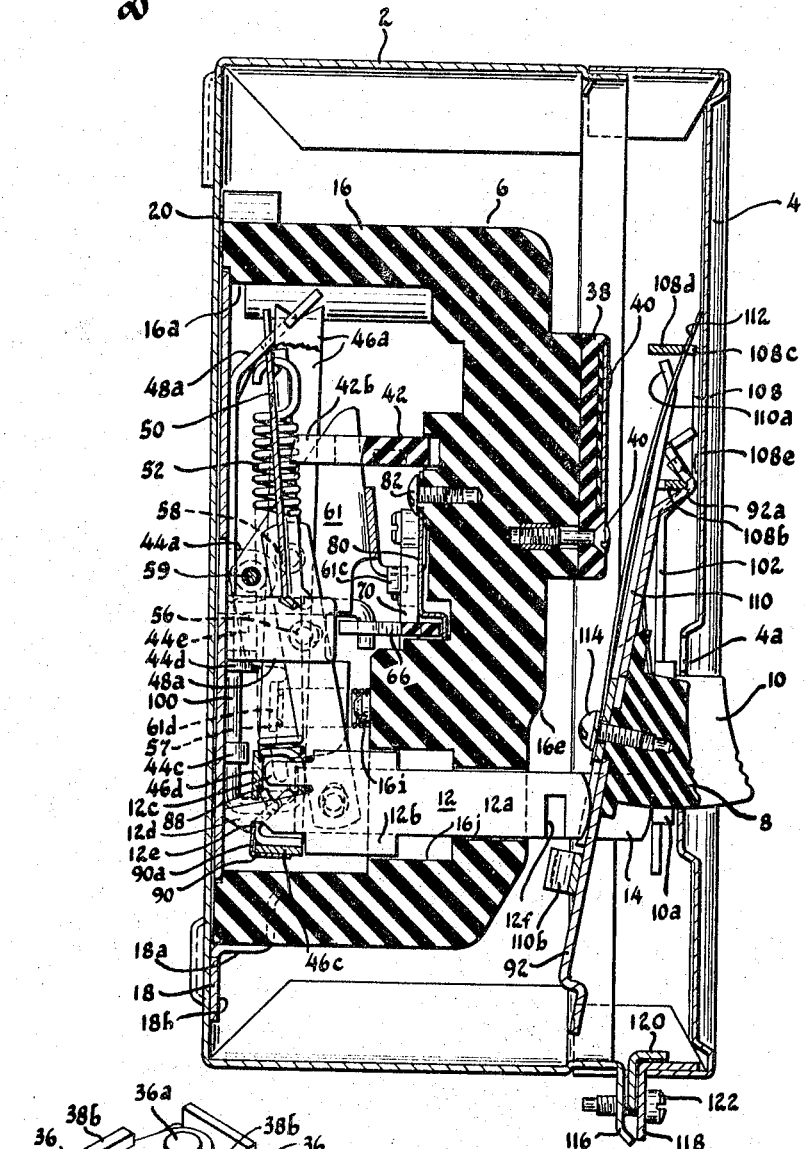
FIG. 5 is a view in longitudinal section taken along the line 5—5 of FIG. 3.
Figure 18:
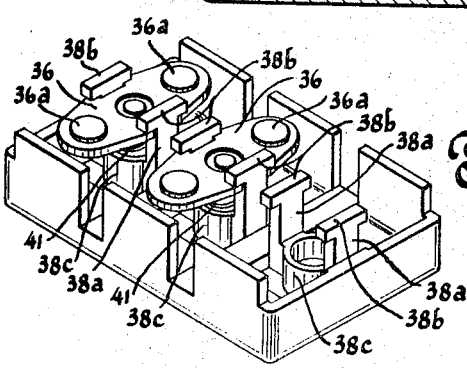
FIG. 18 is a bottom isometric view of the contact cover block showing two of the stationary contacts mounted therein.

As best shown in FIG. 5, operating member 12 has a portion 12a which extends through and upwardly beyond the barrier 16e. The portion 12a merges with a portion 12b of wider dimension which is guided in a recess 16j in base 16. The upper end wall of recess 16j defines the outer limit for movement of member 12. At the lower end of member 12 is an integral tab 12c and a latch catch portion 12d. A compression spring 88 is disposed about tab 12c and at its upper end biases against the shoulder between tab 12c and portion 12b. At its lower end spring 88 is centered about a boss formed about a right angle bracket 46d secured to and extending upwardly from one of the legs 46a of lever 46.

Figure 16:
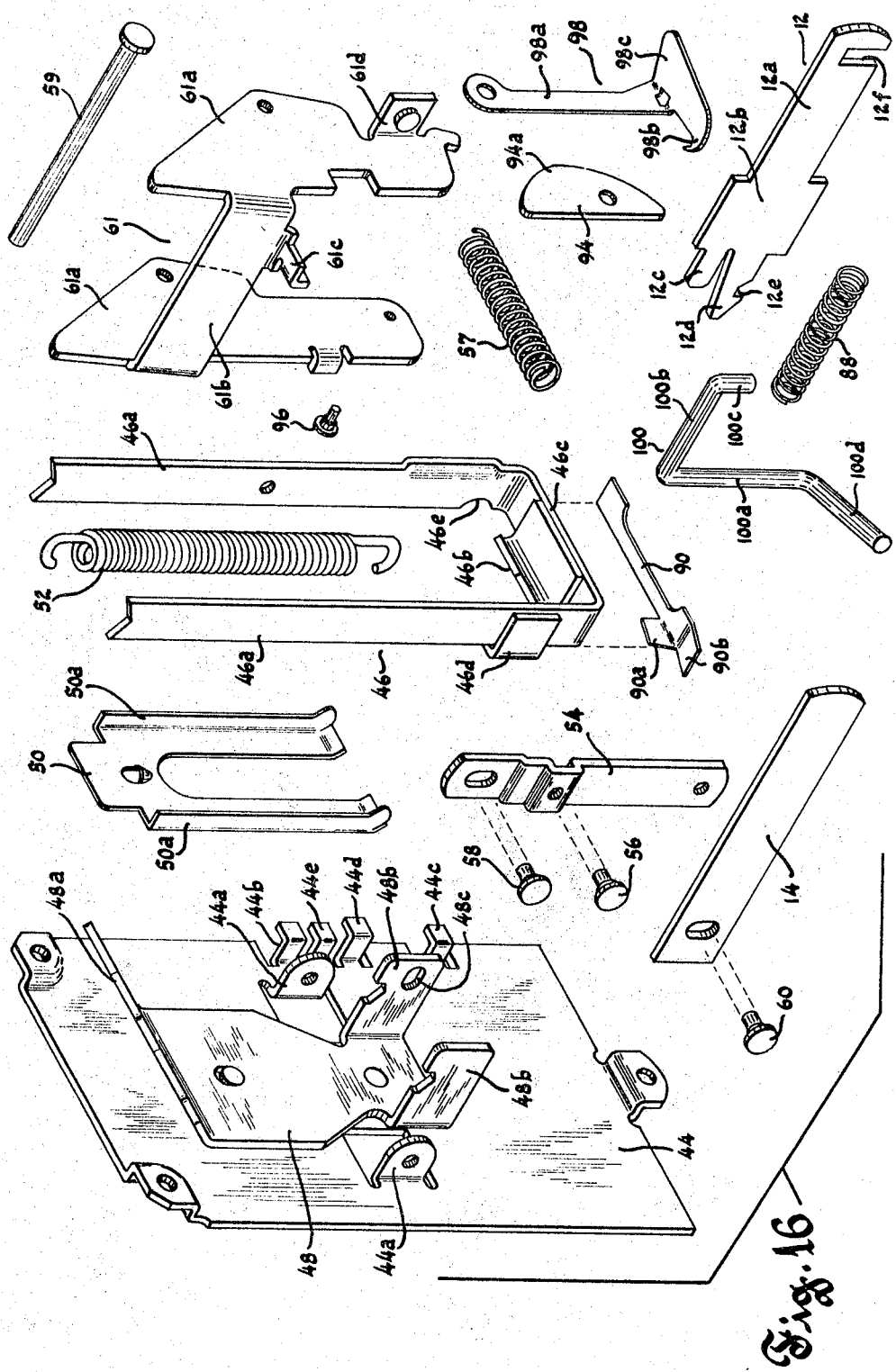
FIGURE 16 is an exploded view in perspective of the manual operating and reset mechanism forming part of the switch unit.

As best shown in FIGS. 5, 11 and 16, a latch 90, formed of flat spring metal, is spot welded adjacent one end to the outer surface of the bight 46c of lever 46. Latch 90 has a latch portion 90a which extends inwardly between legs 46a of lever 46, and a tab 90b which extends beyond the bight 46c to one side of a leg 46a. Latch 90 is spot welded so that tab 90b and latch portion 90a can be moved back a limited amount so that the forward edge of the latter portion can be moved back away from the bight 46c of lever 46.

As shown in FIG. 5, under normal operating conditions the latching portion 90a of latch 90 engages the latch catch 12d in a notch 12e thereof, thereby operatively connecting operating member 12 to lever 46. Thus when start button 8 is moved downwardly, a lever 92 to which button 8 is secured, engages member 12 and the shoulder between portions 12b and latch catch portion 12d in engagement with the bight 46c of lever 46 pivots the latter clockwise as viewed in FIG. 5. When lever 46 is pivoted in the reverse direction by downward movement of operating member 14 as hereinbefore described, operating member 12 will stay operatively connected to lever 46, and move upwardly part way in the recess 16j.

Assume that the switch unit 6 is in the operating condition depicted in FIG. 5, wherein the contactors 36 are closed to the alined pairs of stationary contacts 31–34, and an overload occurs which causes release of trip lever 61 to drive operator 42 to open the contacts as aforementioned. As the ends of lever 61 farthest from pivot pin move downward toward the mounting plate 44, a crescent-shaped member 94 freely rotatable on a pivot pin 96 secured on a leg 61a adjacent the last mentioned end of lever, engages its arcuate edge 94a with the plate, and rocks on such plate, thereby engaging and pressing tab 90b and latch portion 90a of latch 90 away from the bight 46c to unlatch operating member 12 from lever 46. When member 12 is unlatched, it moves upwardly until the shoulder between the portions 12a and 12b engages the inner end wall of recess 16j. Lever 92 and start button 8 are correspondingly moved upwardly so start button 8 assumes its outermost or "overload" trip indicating position.

When lever 61 is in its "overload" trip position a hook member 98 which is formed from flat spring metal stock and secured to the inside of a leg 61a against the end of an elongated shank portion 98a, has its right angle hook portion 98b cammed, by engagement of the end 98c, with mounting plate 44, to overlie a leg 46a of lever 46 (see FIG. 11). A slide bar reset lever 100 has a central or pivot portion 100a which seats on one edge of mounting plate under upwardly and outwardly struck up tabs 44c and 44d. Another portion 100b is integral and extends from portion 100a at a right angle between tab 44b and a third tab 44e, which, with tab 44b secures member 100 against movement longitudinally of plate 44. The portion 100b in turn merges into a short free end portion 100c that bears at a right angle and is parallel with the portion 100a, a fourth integral portion 100d extends at a right angle from portion 100a and underlies the lower edges of the levers 46; the latter having a leg 46a with a cut-away notch 46c to provide clearance for the portion 100d of reset lever 100. Lever 100 is adapted to pivot by axial rotation of its portion 100a in the socket afforded by the tabs 44c–44d.

The reset trip lever 61, slide bar 66 and bell crank latch lever 80 following "overload" trip operation are reset when stop-reset button 10 is subsequently depressed. Button 10 is secured to a lever 102 which engages the outer end of operating member 14. Thus depression of button 10 results in downward movement of member 14 which, through its aforedescribed connections through lever 54, pivots lever 46 upwardly relative to the notched ends of its legs 46a. After limited upward movement it engages on the lower side of hook portion 98c of member 98 and upon continued upward movement pivots lever 61 about its pivot pin 59 against the bias of the spring 57. Subsequently, the end of the member 14 engages the portion 100d of reset lever 100 and further downward movement of member 14 results in the pivoting of lever 100 along the axis of its portion 100a with the result that the portion 100c which is in engagement with slide bar 66 moves the latter to the right as viewed in FIG. 15.

Slide bar 66 in moving to the right pivots lever 80 clockwise out of engagement with operator 42 so that the latter can return to its normal or contact closing position. In moving to the right slide bar 66 relieves the bias exerted on the shank of latch lever 63 and the latter then pivots counterclockwise under the bias of spring 84. When lever 61 reaches is normal position the roller 63a will then be biased into place behind the latch lug 61c thereby relatching lever 61 in its normal position.

Upon the next depression of start button 8, operating member 12 will again be relatched in operative connection to the bight 46b of lever 46 so that member 12 will thereafter move inwardly and outwardly of base 16 in accordance therewith. With lever 61 in normal latched-up position the crescent-shaped member 94, due to its off-center pivoted mounting, assumes a position in which the tab 90b is not engaged and consequently latch portion 90a assumes its normal position. Thus, when member 12 moves downwardly its catch portion 12d first rides over portion 90a and the edge of the latter then falls into the notch 12e in portion 12d to complete the reconnection between member 12 and lever 46.

Cover 4 of the enclosing case has an opening 4a through which the start button 8 and stop-reset button 10 extend. The portion of opening 4a around button 10 conforms to the general form of the latter but that around button 10 is elongated along the shorter dimension of button 8 for a purpose that will hereinafter be fully explained.

Button 10 is secured to a lever 102 by a screw 104 that penetrates alined opening in button 10, lever 102 and a flat spring member 106. Adjacent one end lever 102 is provided with an inverted V-shaped bearing portion 102a that bears and pivots about an edge of a slot 108a in a leg 108b of a channel-shaped bracket 108 secured to the inner surface of cover 4. Spring member 106 is biased across the lower edge of leg 108a and adjacent its free end extends through a slot 108c in the other leg 108d of bracket 108. Spring 106 biases lever 102 and button 10 inwardly of the cover 4 to hold lever 102 in engagement with the curved end of operator 14. Spring 106 does not exert sufficient force to cause the aforedescribed movement of operator 14 inwardly of switch unit 6, and additional force applied by a human operator to button 10 is required for such operation. A lower peripheral flange 10a on button 10 engages the inner surface of the cover to limit its outward movement.

As aforementioned, start button 8 is mounted on a lever 92. Button 8 is provided with a shallow channel groove 8a on its lower surface to accommodate lever 92. Lever 92 is provided with an inverted V-shaped bearing portion 92a adjacent one end that bears and pivots about an edge of a slot 108e in leg 108b of bracket 108. A heavier cross section flat spring member 110 abuts against the lower surface of lever 92, and a spring member 112, like spring 106, in turn abuts the lower surface of spring member 110. Button 8, lever 92 and spring members 110 and 112 are held together in assembled relation by a screw 114. Spring member 112 is biased across the lower edge of leg 108b and bears against an edge of a slot in leg 108d.

In the positions depicted in FIGS. 1, 2, 4 and 5, spring 112 biases button 10, lever 92 and spring 110 inwardly of cover 4 so that the lower surface of lever 92 engages the arcuate end 12a of operator 12. Button 8 is provided with a lower peripheral flange which engages in lower surface of cover 4 to limit its outward movement. Inward depression of button 8 results in movement of operator 12 inward of the switch unit to close the contactors 36 to the alined pairs of stationary contacts 31–34 as aforedescribed.

Button 8 and spring members 110 and 112 can be slid along lever 92 to the positions depicted in FIGS. 6 and 7; the aforementioned elongation of opening 4a permitting such movement of button 8. In this position angularly downwardly turned bifurcated ends 110a of spring member 110 engage the lower edge of leg 108b and bias lever 92 and button 8 outwardly of cover 4. In this latter position a depending right angle hook portion 110b of member 110 is interposed in a slot 12f in operator 12 and engages the latter along the upper edge of such slot.

When start button 8 is depressed to move operator 12 inwardly of base 16 to operate the switch unit to contact closed position subsequent release of button 8 will then result in automatic return of the switch unit 6 to circuit open condition without need for operation of stop-reset button 10 as afore-described. The biasing force of spring member 110 when in operative position is such as to operate the manual over-center contact operating mechanism by the outward pull exerted through operator 12 on lever 46 when button 8 is released. The last mentioned positioning of button 8 provides for a momentary or "jogging" type of operation which is useful in certain applications, particularly when a motor has to be intermittently "inched" during threading or work set-up operations.

It will be understood that if desired the last mentioned type of operation is optional, and if not required, start button 8 could then be supported on a lever and biasing spring arrangement duplicating that for stop-reset button 10. Also the opening around start button 8 in the cover need not be elongated and can conform fairly closely to the peripheral dimensions of button 8.

As best shown in FIGS. 1, 4 and 7, casing 2 and cover 4 are provided with parallel brackets 116 and 118 which have two pairs of alined openings through which hasps of padlocks can be passed to afford locking of the cover to the casing. A lever 120 having a channel-shaped portion 120a is mounted on a flat spring member on the inside of an edge of cover 4. When pushed inwardly to the dotted line position shown in FIG. 4, locking a padlock through the alined openings in brackets 116 and 118 will hold lever 120 in such position to lock start button 8 and lever 92 in their upper positions. This affords locking of button 8 to prevent its movement to effect operation of the controller to circuit completing position. A screw 122 penetrating and trapped in an opening in bracket 118 takes into an alined threaded opening in bracket 116 to provide another or supplementary securement of cover 4 to casing 2.

I claim:

1. In combination, an open sided housing and a cover for closing the open side of said housing, a two position, snap-action switch unit mounted in said housing and having a pair of alternately reciprocably movable operating members extending toward the open side of said housing, and an operating mechanism for said switch unit operating members mounted on said cover and comprising a pair of pushbuttons extending through said cover in alinement with the ends of said operating members, means providing individual pivotal support for each of said pushbuttons and biasing the same into engagement with the ends of their associated operating members and normally inactive means for one of said pushbuttons which is rendered active when the latter pushbutton is laterally moved on said cover from a normal to a second position to provide a two-way driving connection between said pushbutton and its associated operating member and to exert a bias outwardly of said switch unit on the last mentioned operating member sufficient to actuate said switch unit from one operating position to the other when said last mentioned pushbutton is released.

2. The combination in accordance with claim 1, wherein said means providing individual pivotal support for said pushbutton comprises first and second levers pivotally mounted on the inside of said cover on which said pushbuttons are respectively mounted, said spring members biasing each of said levers into engagement with respective switch unit operating members, and wherein said normally inactive means comprises a spring-lever member on which said one of said pushbuttons is mounted and movable with its lever from its said normal to its said second position to pivotally bear against an abutment on the inside of said cover and engage said last mentioned operating member to provide the aforestated outward bias on and two-way driving connection with the latter.

3. In combination, a sheet metal housing open at one side, an electrical controller seated on the inner wall of said housing, first and second spring means secured to said inner wall of said housing and gripping portions of said controller at opposite ends thereof to hold the same in seated position, said first spring means gripping its associated portion of the controller to prevent lateral movement on said inner wall but permitting pull-away of the same in a direction normal to said wall when sufficient force is exerted, and said second spring means preventing movement of its portion either laterally or normal to said inner wall except when the portion at the opposite side is disengaged from said first spring means and then permitting movement of its associated portion of said controller laterally clear thereof to permit removal of the entire controller from said housing.

4. The combination according to claim 2 wherein said cover has depending sides which overlie portions of the sides of said housing, wherein parallel brackets are secured in juxtaposition on adjacent sides of said cover and housing and have alined openings, wherein a member projects through an opening in the last mentioned side of said cover and is mounted on a spring secured to said cover which normally holds it in interfitting relation to at least one pair of alined openings, said member being movable against the bias of said spring to underlie one of the levers and to clear said pair of alined openings to permit securement of a hasp therethrough to lock said cover to said housing and lock the last mentioned lever and the pushbutton carried thereon against movement inwardly of said housing.

References Cited

UNITED STATES PATENTS

| | | | |
|---|---|---|---|
| 2,300,102 | 10/1942 | Christensen | 200—50.1 |
| 2,737,262 | 3/1956 | Ferraris | 200—50.1 |
| 2,903,541 | 9/1959 | Berry | 200—172 |

ROBERT K. SCHAEFER, *Primary Examiner.*

H. BURKS, *Assistant Examiner.*